United States Patent [19]
Hultgren et al.

[11] Patent Number: 6,120,249
[45] Date of Patent: Sep. 19, 2000

[54] GAS TURBINE BLADE PLATFORM COOLING CONCEPT

[75] Inventors: Kent Goran Hultgren, Winter Park; Thomas Walter Zagar; William E. North, both of Winter Springs, all of Fla.; Stephen Humphrey Robbins, Thulston; Graham Mark Upton, Derby, both of United Kingdom

[73] Assignee: Siemens Westinghouse Power Corporation, Orlando, Fla.

[21] Appl. No.: 08/629,952

[22] Filed: Apr. 10, 1996

Related U.S. Application Data

[63] Continuation of application No. 08/331,451, Oct. 31, 1994, abandoned.

[51] Int. Cl.[7] .................................................. F01D 5/18
[52] U.S. Cl. .................................... 416/97 R; 416/193 A
[58] Field of Search .............................. 415/115; 416/95, 416/96 R, 97 R, 193 A

[56] References Cited

U.S. PATENT DOCUMENTS

| | | | |
|---|---|---|---|
| 3,066,910 | 12/1962 | Bluck | 416/193 A |
| 3,628,880 | 12/1971 | Smuland et al. | 416/97 A |
| 3,844,679 | 10/1974 | Grondahl et al. | 416/95 |
| 3,853,425 | 12/1974 | Scalzo et al. | |
| 4,012,167 | 3/1977 | Noble . | |
| 4,017,213 | 4/1977 | Przirembel | 415/115 |
| 4,353,679 | 10/1982 | Hauser | 415/115 |
| 5,098,257 | 3/1992 | Hultgren et al. | 415/115 |
| 5,281,097 | 1/1994 | Wilson et al. | 416/193 A |
| 5,344,283 | 9/1994 | Magowan et al. | 416/193 A |

FOREIGN PATENT DOCUMENTS

| | | |
|---|---|---|
| 2316440 | 1/1977 | France . |
| 1801475 | 4/1978 | Germany . |
| 1605220 | 8/1984 | United Kingdom . |
| 94/17285 | 4/1994 | WIPO . |

*Primary Examiner*—Christopher Verdier
*Attorney, Agent, or Firm*—Eckert Seamans Cherin & Mellott, LLC

[57] ABSTRACT

A turbine blade with a cooling air flow path specifically directed toward cooling the platform portion of the blade root. Cooling air passages are formed in the blade root platform just below its radially outward facing surface on an overhanging portion of the platform opposite the convex surface of the blade airfoil. Each of these passage extends radially outward from an inlet that receives a flow of cooling air, and then extends through the platform. Cavities are formed in a radially inward facing surface of an over hanging portion of the platform opposite the concave surface of the blade airfoil. An impingement plate directs cooling air as jets into these cavities. A passage is connected to the cavities and directs this cooling air through the overhanging portion of the platform opposite the concave surface.

8 Claims, 7 Drawing Sheets

GAS TURBINE BLADE PLATFORM COOLING CONCEPT

This application is a continuation, of application Ser. No. 08/331,451, filed Oct. 31, 1994, now abandoned.

BACKGROUND OF THE INVENTION

The present invention relates to the rotating blades of a gas turbine. More specifically, the present invention relates to a scheme for cooling the platform portion of a gas turbine blade.

A gas turbine is typically comprised of a compressor section that produces compressed air. Fuel is then mixed with and burned in a portion of this compressed air in one or more combustors, thereby producing a hot compressed gas. The hot compressed gas is then expanded in a turbine section to produce rotating shaft power.

The turbine section typically employs a plurality of alternating rows of stationary vanes and rotating blades. Each of the rotating blades has an airfoil portion and a root portion by which it is affixed to a rotor. The root portion includes a platform from which the airfoil portion extends.

Since the vanes and blades are exposed to the hot gas discharging from the combustors, cooling these components is of the utmost importance. Traditionally, cooling is accomplished by extracting a portion of the compressed air from the compressor, which may or may not then be cooled, and directing it to the turbine section, thereby bypassing the combustors. After introduction into the turbine, the cooling air flows through radial passages formed in the airfoil portions of the vanes and blades. Typically, a number of small axial passages are formed inside the vane and blade airfoils that connect with one or more of the radial passages so that cooling air is directed over the surfaces of the airfoils, such as the leading and trailing edges or the suction and pressure surfaces. After the cooling air exits the vane or blade it enters and mixes with the hot gas flowing through the turbine section.

Although the approach to blade cooling discussed above provides adequate cooling for the airfoil portions of the blades, traditionally, no cooling air was specifically designated for use in cooling the blade root platforms, the upper surfaces of which are exposed to the flow of hot gas from the combustors. Although a portion of the cooling air discharged from the upstream vanes flowed over the upper surfaces of the blade root platforms, so as to provide a measure of film cooling, experience has shown that this film cooling is insufficient to adequately cool the platforms. As a result, oxidation and cracking can occur in the platforms.

One possible solution is to increase the film cooling by increasing the amount of cooling air discharged from the upstream vanes. However, although such cooling air enters the hot gas flowing through the turbine section, little useful work is obtained from the cooling air since it was not subject to heat up in the combustion section. Thus, to achieve high efficiency, it is crucial that the use of cooling air be kept to a minimum.

It is therefore desirable to provide a scheme for cooling the platform portions of the rotating blades in a gas turbine using a minimum of cooling air.

SUMMARY OF THE INVENTION

Accordingly, it is the general object of the current invention to provide a scheme for cooling the platform portions of the rotating blades in a gas turbine using a minimum of cooling air.

Briefly, this object, as well as other objects of the current invention, is accomplished in a gas turbine comprising (i) a compressor section for producing compressed air, (ii) a combustion section for heating a first portion of the compressed air, thereby producing a hot compressed gas, (iii) a turbine section for expanding the hot compressed gas, the turbine section having a rotor disposed therein, the rotor having a plurality of blades attached thereto, each of the blades having an airfoil portion and a root portion, the root portion having a platform from which the airfoil extends, the platform having a first surface exposed to the hot compressed gas and a second surface disposed opposite the first surface, and (iv) means for cooling the blade root platform including means for directing a second portion of the compressed air from the compressor section to impinge against the second surface of the platform.

In a preferred embodiment, the blade root platform cooling means comprises a member spaced from the second surface and having a plurality of cooling air holes formed therein, the second portion of the compressed air flowing through the holes. In addition, a cavity is formed between the member and the second surface for collecting the second portion of the compressed air. The airfoil has convex and concave surfaces, with a first portion of the platform being disposed opposite the concave airfoil surface and a second portion of the platform being disposed opposite the convex surface. The cavity is disposed in the first portion of the platform. In this embodiment, the blade root platform cooling means further comprises a first passage extending through the first portion of the platform and a second passage extending through the second portion of the platform and having an inlet in flow communication with the cavity.

DESCRIPTION OF THE PREFERRED EMBODIMENT

Figure 1:
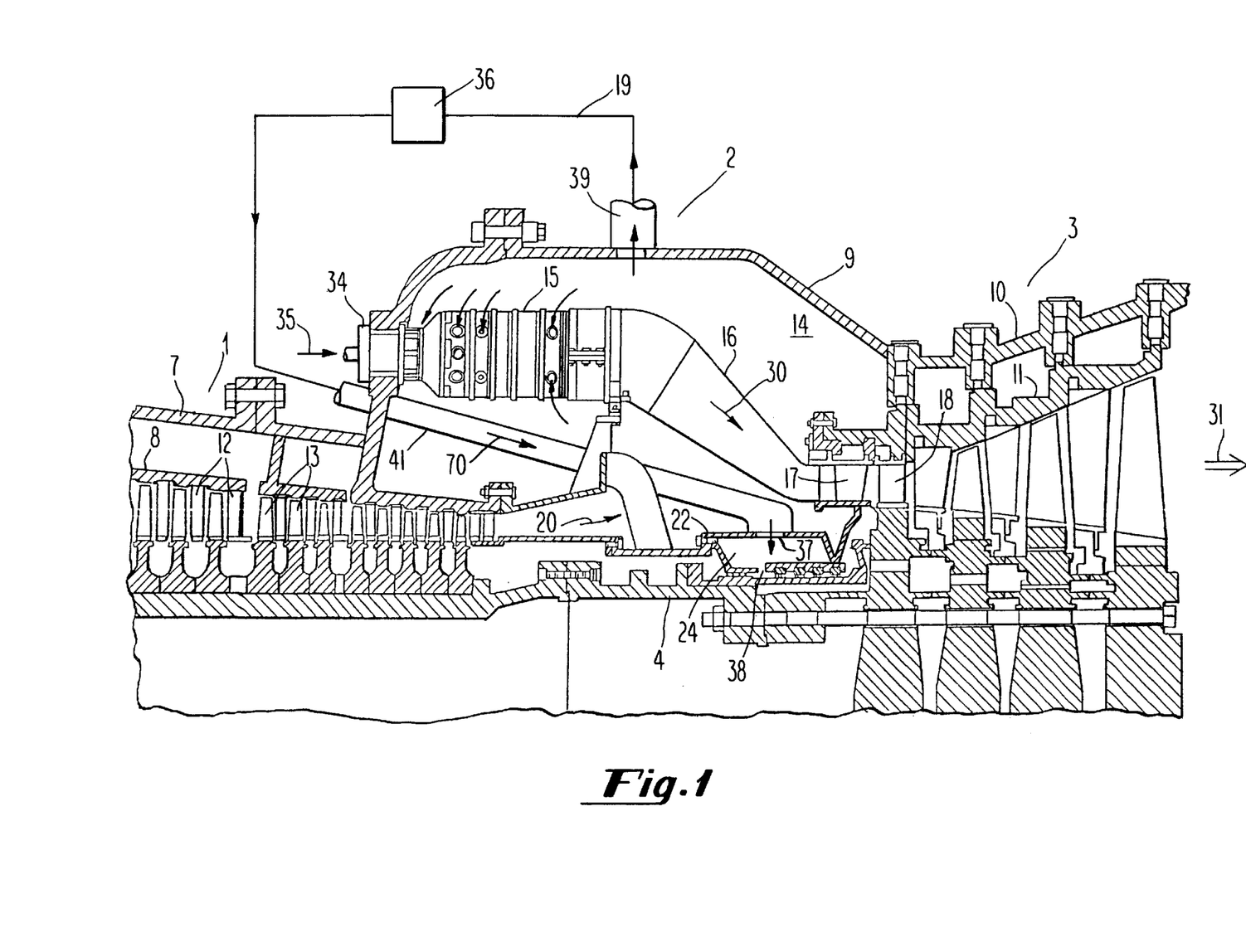
FIG. 1 is a cross-section, partially schematic, through a portion of the gas turbine according to the current invention.

Referring to the drawings, there is shown in FIG. 1 a cross-section through a portion of a gas turbine. The major components of the gas turbine are a compressor section 1, a combustion section 2, and a turbine section 3. As can be seen, a rotor 4 is centrally disposed and extends through the three sections. The compressor section 1 is comprised of cylinders 7 and 8 that enclose alternating rows of stationary vanes 12 and rotating blades 13. The stationary vanes 12 are affixed to the cylinder 8 and the rotating blades 13 are affixed to discs attached to the rotor 4.

The combustion section 2 is comprised of an approximately cylindrical shell 9 that forms a chamber 14, together with the aft end of the cylinder 8 and a housing 22 that encircles a portion of the rotor 4. A plurality of 5 combustors 15 and ducts 16 are contained within the chamber 14. The ducts 16 connect the combustors 15 to the turbine section 3. Fuel 35, which may be in liquid or gaseous form—such as distillate oil or natural gas—enters each combustor 15 through a fuel nozzle 34 and is burned therein so as to form a hot compressed gas 30.

The turbine section 3 is comprised of an outer cylinder 10 that encloses an inner cylinder 11. The inner cylinder 11 encloses rows of stationary vanes 17 and rows of rotating blades 18. The stationary vanes 17 are affixed to the inner cylinder 11 and the rotating blades 18 are affixed to discs that form a portion of the turbine section of the rotor 4.

In operation, the compressor section 1 inducts ambient air and compresses it. The compressed air 20 from the compressor section 1 enters the chamber 14 and is then distributed to each of the combustors 15. In the combustors 15, the fuel 35 is mixed with the compressed air and burned, thereby forming the hot compressed gas 30. The hot compressed gas 30 flows through the ducts 16 and then through the rows of stationary vanes 17 and rotating blades 18 in the turbine section 3, wherein the gas expands and generates power that drives the rotor 4. The expanded gas 31 is then exhausted from the turbine 3.

A portion 19 of the compressed air 20 from the compressor 1 is extracted from the chamber 14 by means of a pipe 39 connected to the shell 9. Consequently, the compressed air 19 bypasses the combustors 15 and forms cooling air for the rotor 4. If desired, the cooling air 19 may be cooled by an external cooler 36. From the cooler 36, the cooled cooling air 70 is then directed to the turbine section 3 by means of a pipe 41. The pipe 41 directs the cooling air 70 to openings 37 formed in the housing 22, thereby allowing it to enter a cooling air manifold 24 that encircles the rotor 4.

Figure 2:
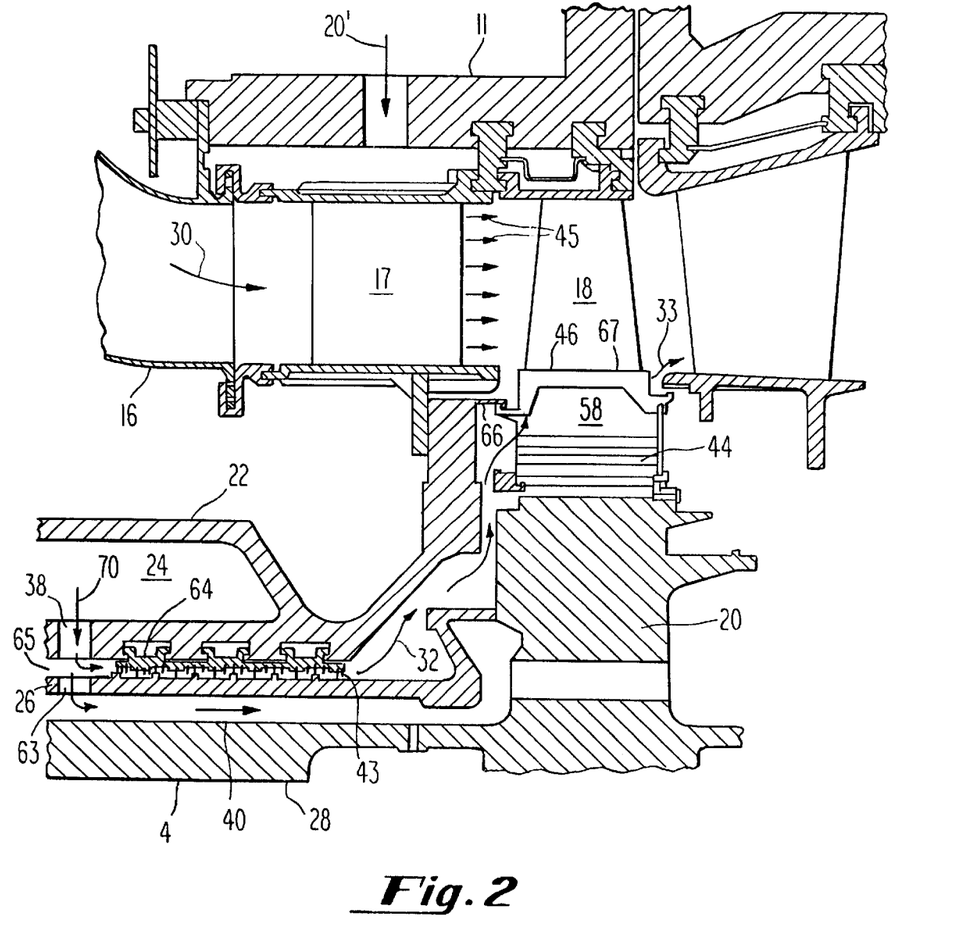
FIG. 2 is a detailed view of the portion of the turbine section shown in FIG. 1 in the vicinity of the first row blade.

As shown in FIG. 2, in the turbine section 3, the hot compressed gas 30 from the combustion section 2 flows first over the airfoil portion of the first stage vanes 17. A portion of the compressed air 20' from the compressor 1 flows through the first stage vane airfoil for cooling thereof. A plurality of holes (not shown) in the first stage vane airfoil discharges the cooling air 20' as a plurality of small streams 45 that are then mixed into the hot gas 30. The mixture of the cooling air 45 and the hot gas 30 then flows over the airfoil portion of the first row of blades 18.

Although, as previously discussed, the radially innermost of the streams 45 of cooling air from the first stage vane 17 can be expected to provide a certain amount of film cooling of the row one blade platform 46, experience has shown that this cooling means is insufficient. Consequently, the current invention is directed to a scheme for providing additional cooling of the platform 46.

As shown in FIG. 2, the rotor cooling air 70 exits the cavity 24 via circumferential slots 38 in the housing 22, whereupon it enters an annular passage 65 formed between the housing 22 and a portion 26 of the rotor 4 that is typically referred to as the "air separator." From the annular passage 65, the majority 40 of the cooling air 70 enters the air separator 26 via holes 63 and forms the cooling air that eventually finds its way to the rotor disc 20 and then to the various rows of blades.

A smaller portion 32 of the cooling air 70 flows downstream through the passage 65, over a number of labyrinth seals 64. From the passage 65 the cooling air 32 then flows radially outward. A honeycomb seal 66 is formed between the housing 22 and a forwardly extending lip of the row one blade 18. The seal 66 prevents the cooling air 32 from exiting directly into the hot gas flow path. Instead, according to the current invention, the cooling air 32 flows through passages, discussed in detail below, formed in the platform 46 of each row one blade 18, thereby cooling the platform and preventing deterioration due to excess temperatures, such as oxidation and cracking. After discharging from the platform cooling air passages, the spent cooling air 33 enters the hot gas 30 expanding through the turbine section 3.

Figure 3:
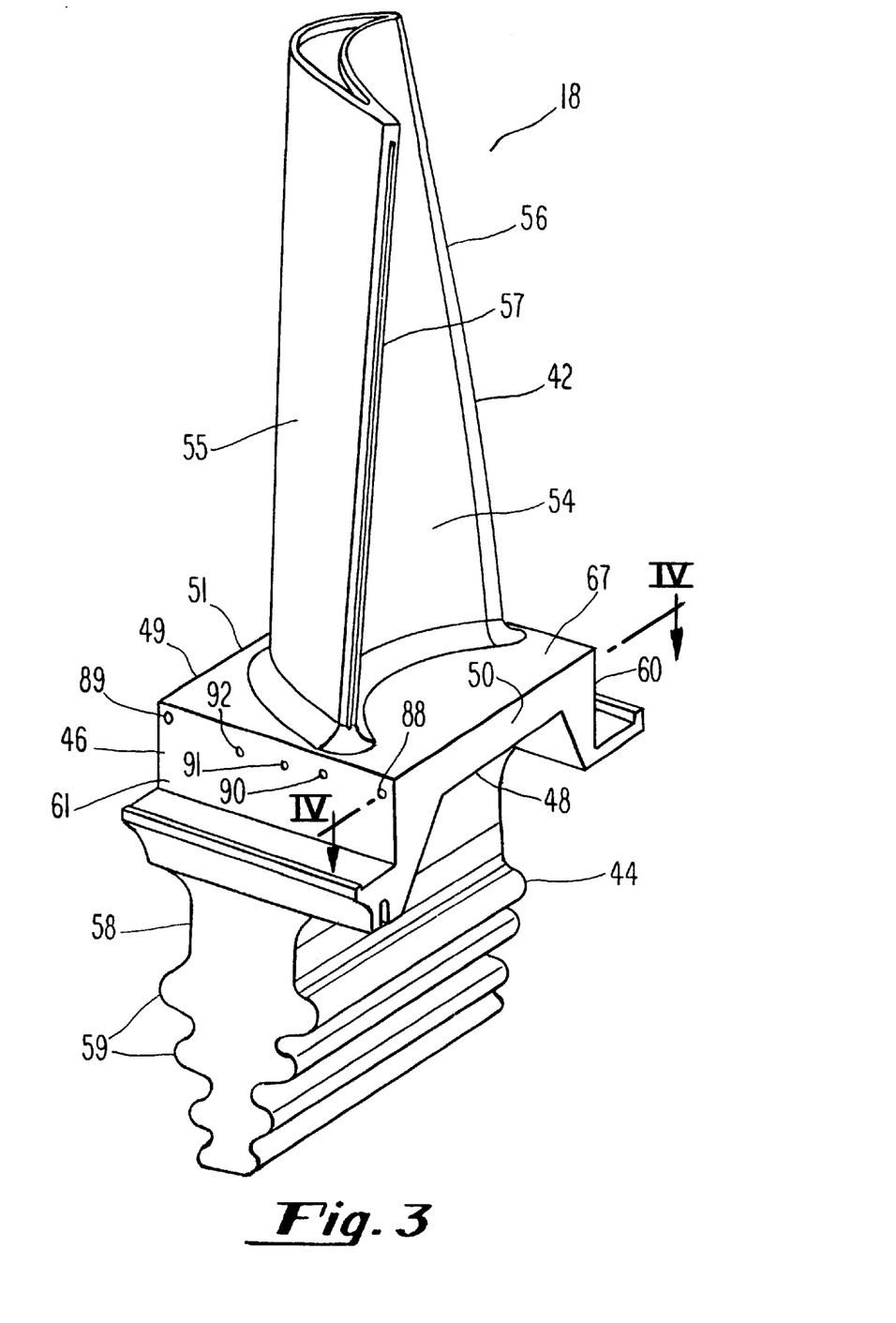
FIG. 3 is an isometric view, looking against the direction of flow, of the first row blade shown in FIG. 2.
Figure 5:
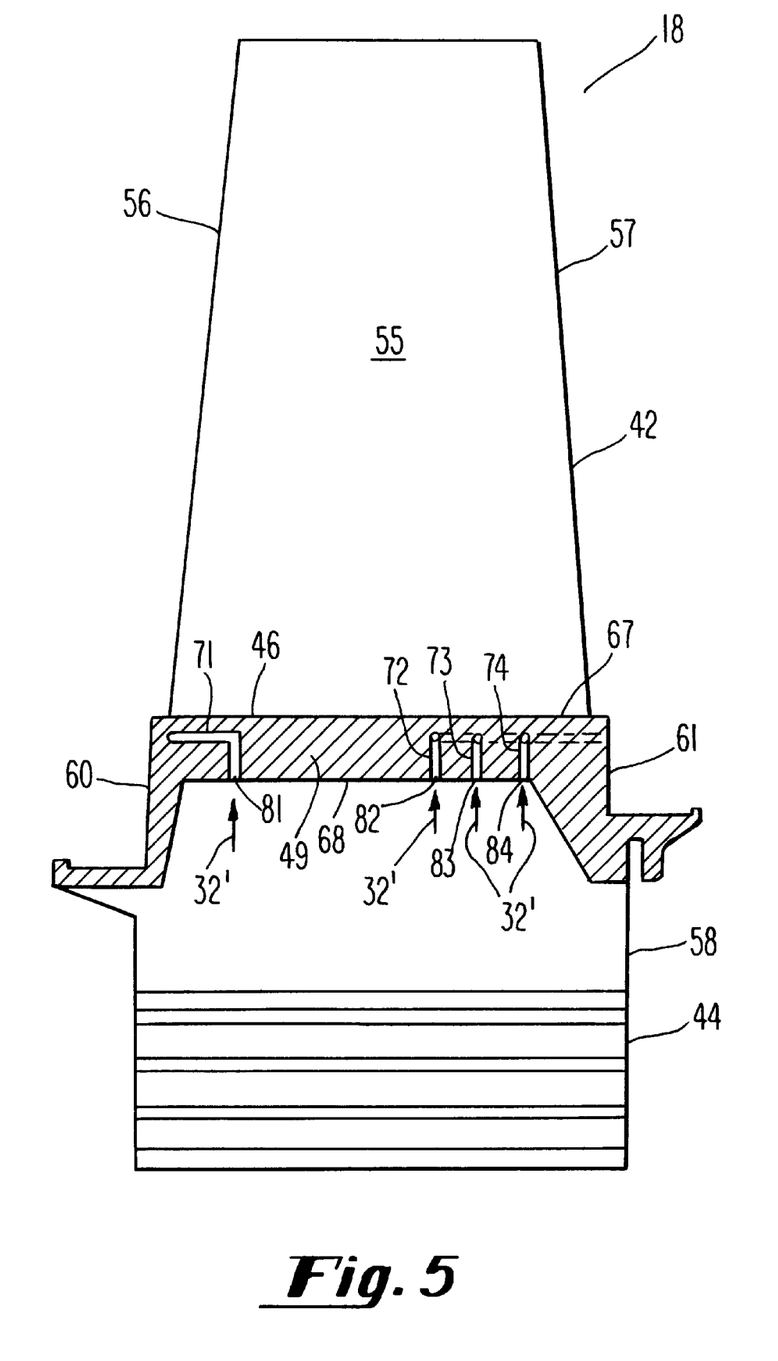
FIG. 5 is an elevation cross-section taken through line V—V shown in FIG. 4, showing the portion of the platform opposite the convex side of the airfoil.
Figure 6:
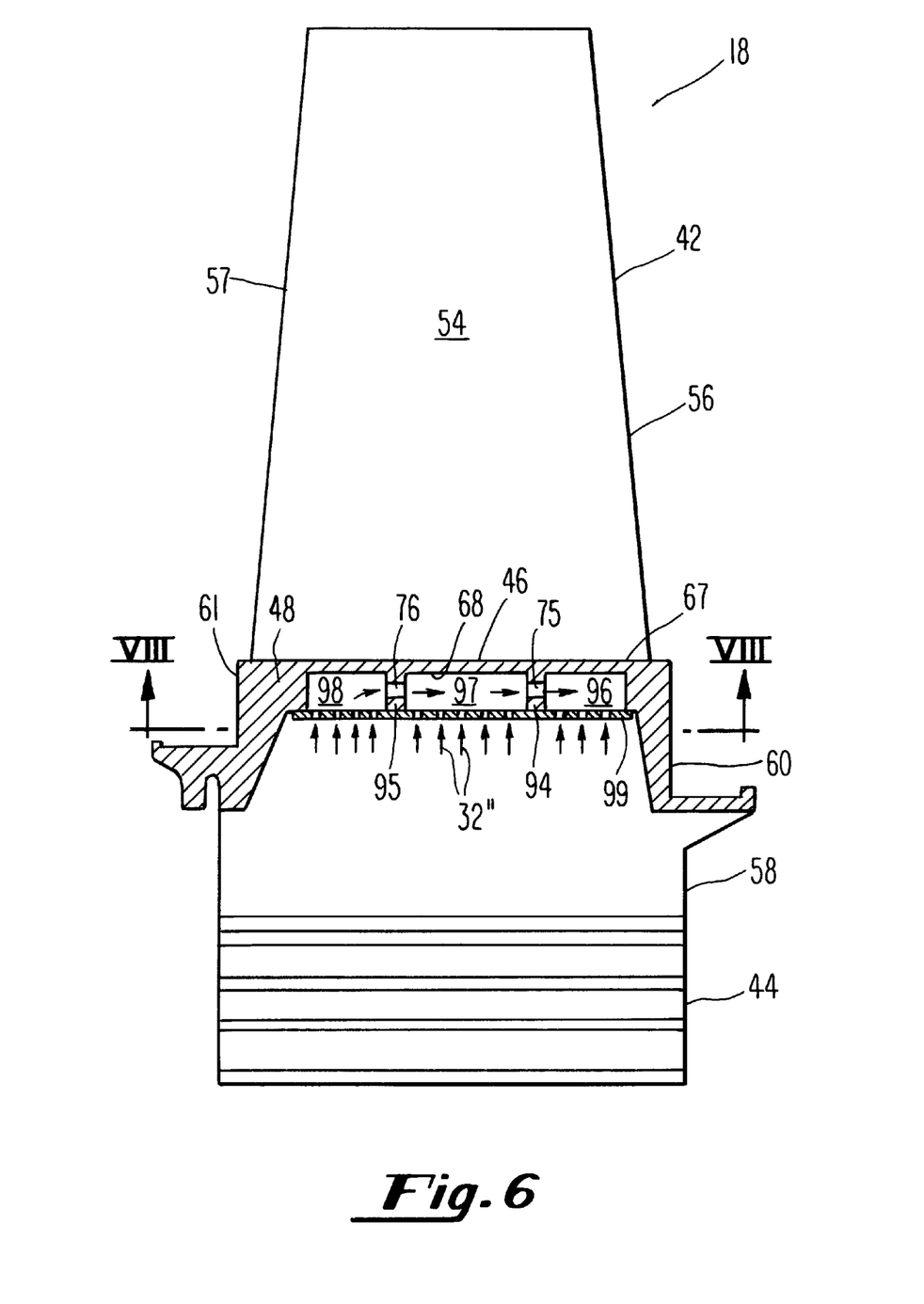
FIG. 6 is an elevation cross-section taken through line VI—VI shown in FIG. 4, showing the portion of the platform opposite the concave side of the airfoil.

As shown in FIGS. 3, 5 and 6, each row one turbine blade 18 is comprised of an airfoil portion 42 and a root portion 44. The airfoil portion 42 has a leading edge 56 and a trailing edge 57. A concave pressure surface 54 and a convex suction surface 55 extend between the leading and trailing edges 56 and 57 on opposing sides of the airfoil 42. The blade root 44 has a plurality of serrations 59 extending along its lower portion that engage mating serrations in a groove 47 formed in the rotor disc 20, thereby securing the blades to the disc, as shown in FIG. 7.

A platform portion 46 is formed at the upper portion of the blade root 44. The airfoil 42 is connected to, and extends radially outward from, the platform 46. A radially extending shank portion 58 connects the lower serrated portion of the blade root 44 with the platform 46. The platform 46 has radially extending upstream and downstream faces 60 and 61, respectively. In addition, a portion 48 of the platform 46 extends transversely from the airfoil so as to overhang the shank 58 opposite the concave 54 surface of the airfoil 42. The overhanging portion 48 terminates in a laterally extending edge 50. Another portion 49 of the platform 46 extends transversely from the airfoil so as to overhang the shank 58 opposite the convex surface 55 of the airfoil 42. The overhanging portion 49 terminates in a laterally extending edge 51.

Figure 4:
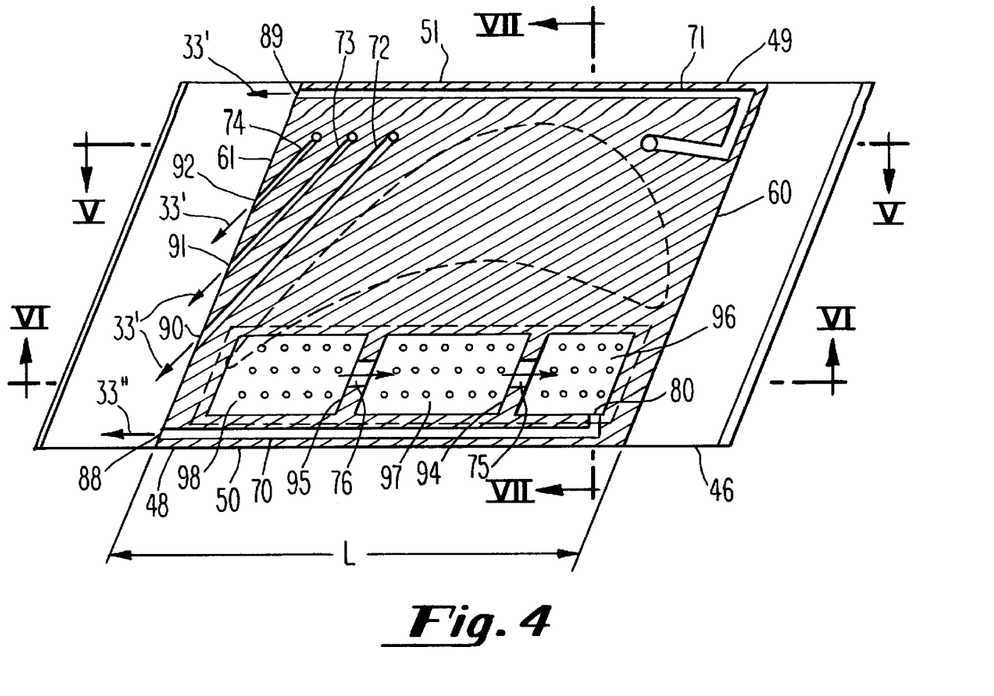
FIG. 4 is a transverse cross-section taken through line IV—IV shown in FIG. 3, showing the platform section of the blade. Note that the airfoil has been shown in phantom in this Figure in order to orient the viewer although the airfoil actually extends only above the location at which the cross-section is taken.
Figure 7:
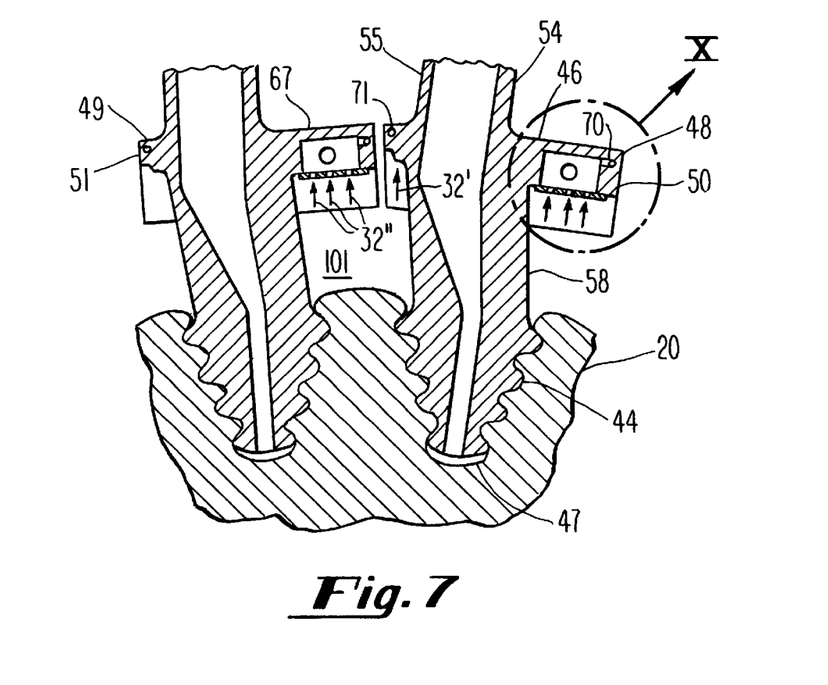
FIG. 7 is a cross-section taken through line VII—VII shown in FIG. 4, showing two adjacent blades.
Figure 8:
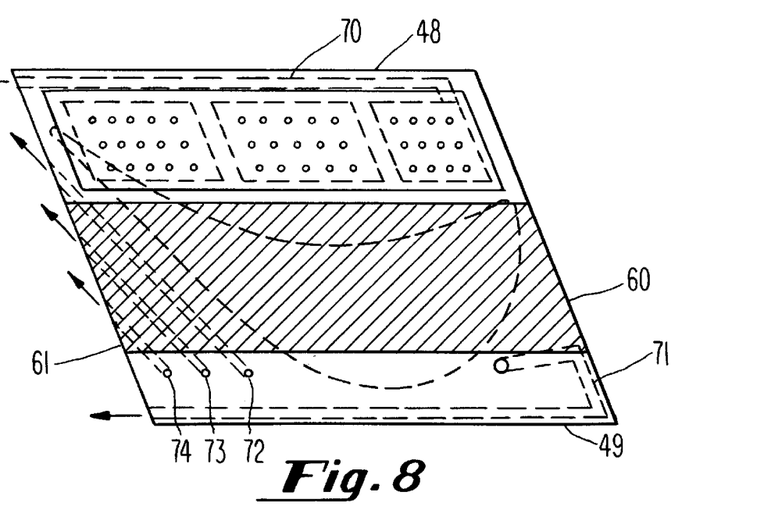
FIG. 8 is a cross-section taken through line VIII—VIII shown in FIG. 6, showing the underside of the platform.
Figure 9:
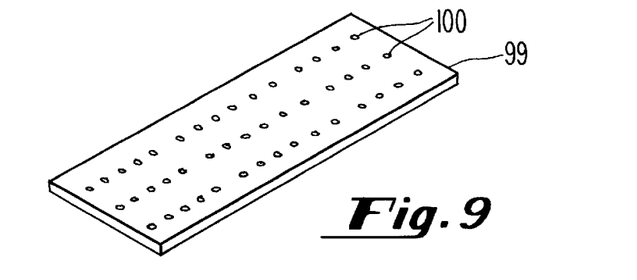
FIG. 9 is an isometric view of the impingement plate.

As shown best in FIGS. 4, 6 and 7, three cavities 96–98 are formed in the overhanging portion 48 of the platform 46. The cavities 96–98 are separated by support ribs 94 and 95. Holes 75 and 76 are formed in the ribs 94 and 95, respectively, so that the cavities 96–98 are in flow communication.

As shown in FIGS. 4, 5 and 7, cooling air passages 70 and 71 are formed in the overhanging portions 48 and 49, respectively, of the platform 46. The cooling air holes 70 and 71 have longitudinally extending portions that are located just below, and extend substantially parallel to, the radially outward facing platform surface 67, which is exposed to the hot gas 30. As shown in FIG. 4, the cooling air passage 70 has an inlet 80 formed in cavity 96. From the inlet 80, the passage 70 extends transversely toward the lateral edge 50 of the platform 46 and then turns 900 and extends longitudinally through a major portion of the length of the platform 46, indicated by L in FIG. 4, just inboard of the lateral edge 50. As used herein, the term "longitudinally" refers to a direction substantially parallel to the lateral edges 50 and 51 of the platform 46. Eventually, the passage 70 forms an outlet 88 in the downstream face 61 of the platform 46. In the preferred embodiment, the passage 70 extends over at least 900 of the length of the platform 46.

The second cooling air passage 71 has an inlet 81 formed in a radially inward facing surface 68 of the platform 46 that is disposed opposite the outward facing surface 67, as shown in FIG. 5. From the inlet 81, the passage 71 extends radially outward toward the radially outward facing surface 67 of the platform 46 and then turns approximately 90° and extends longitudinally toward the upstream face 60 of the platform 46. As shown in FIG. 4, the passage 71 then turns approximately 80° toward the lateral edge 51 of the platform and finally turns 90° and extends longitudinally through a major portion of the platform 46 length L just inboard of the lateral edge 51. Eventually, the passage 71 forms an outlet 89 in the downstream face 61 of the platform 46. In the preferred embodiment, the passage 71 extends over at least 90% of the length L of the platform 46.

Three cooling air passages 72–74 are also formed in the platform 46 that extend diagonally with respect to the lateral edges 50 and 51. As shown in FIG. 5, the passages 72–74 each have an inlet 82–84, respectively, formed in the radially inward facing surface 68 of the overhanging portion 49 of the platform 46. From the inlets 82–84, the passages 72–74 extend radially outward toward the radially outward facing surface 67 of the platform 46 and then turn approximately 90° and extend diagonally through a portion of the platform 46 downstream of the convex airfoil surface 55, as shown in FIG. 4. The passages 72–74 form outlets 90–92, respectively, in the downstream face 61 of the platform 46, as shown in FIGS. 3 and 4.

Preferably, the portions of the cooling air passages 70–74 that extend longitudinally and diagonally are located no more than 1.3 cm (0.5 inch), and most preferably no more than about 0.7 cm (0.25 inch), below the radially outward surface 67 of the platform 46.

As shown in FIGS. 6–10, a generally rectangular impingement plate 99 is attached to the underside of the overhanging portion 48 of the platform 46 and covers the cavities 96–98. The impingement plate 99 is preferably supported along all four of its edges against the portion of the radially inward facing surface 68 surrounding the cavities 96–98 and is attached thereto by welding. In addition, the ribs 94 and 95 provide intermediate support to prevent excessive deflection of the impingement plate 99 due to centrifugal forces. The impingement plate 99 has a plurality of small holes 100 dispersed over its surface. Preferably, ratio of the radial depth of the cavities 96–98 to the diameter of the holes 100 is at least approximately 3:1. This ensures that the plate 99 is sufficiently spaced in the radial direction from the portion of the surface 68 that forms the end of the cavities opposite the impingement plate to allow the holes 100 to form jets of cooling air 32" that impinge on the surface 68, as discussed more fully below. In the preferred embodiment, the radial depth of the cavities 96–98 is approximately 0.12 cm (0.45 inch) and the diameter of the holes 100 is approximately 0.4 cm (0.15 inch).

In operation, the cooling air 32 from the rotor 4 enters the space 101 formed between the shanks 58 of each pair of adjacent blades, as shown in FIG. 7. From the space 101, portions 32' of the cooling air 32 enter the inlets 81–84 of the passages 71–74 formed in the overhanging portion 49 of the platform 46 opposite the convex airfoil surface 55, as shown in FIG. 5. The cooling air 32' then flows through the passages 71–74 of the overhanging portion 49 to the outlets 89–90 formed in the downstream face 61 of the platform 46, as shown in FIGS. 3 and 4, thereby providing convection cooling of a portion of the platform. The spent cooling air 33' then mixes with the hot gas 30 flowing through the turbine section 3, as previously discussed.

Figure 10:
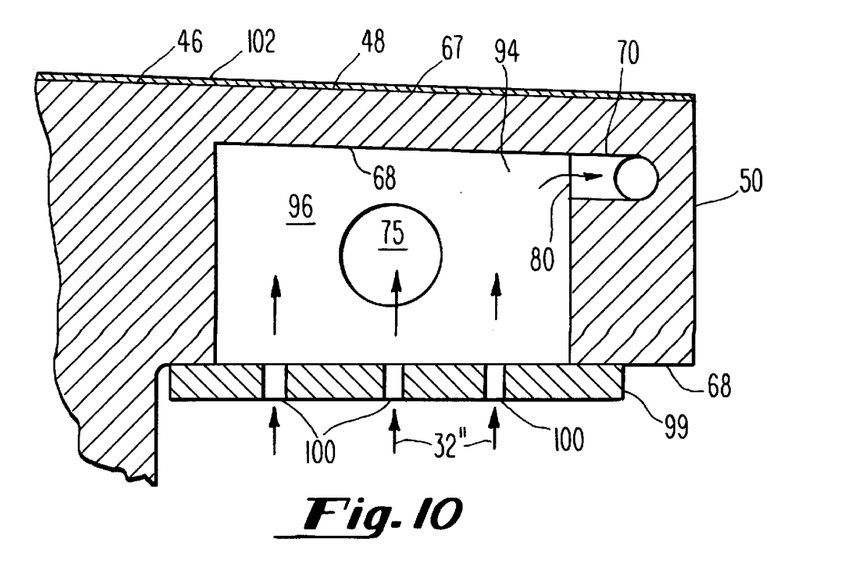
FIG. 10 is a detailed view of the portion of FIG. 7 enclosed by the circle marked X.

Others portions 32" of the cooling air 32 flow from the space 101 to the cavities 96–98 through the holes 100 in the impingement plate 99 on the overhanging portion 48 of the platform 46 opposite the concave airfoil surface 54. As shown in FIG. 10, the impingement plate 99 causes the cooling air 32" to form high velocity jets that impinge on the surface 68 of the overhanging portion 48 of the platform 46, thereby providing impingement cooling. After impinging on the surface 68, the cavities 96–98 collect the jets of cooling air 32". The cooling air 32" flows through the cavities 96–98, via the holes 75 and 76 in the support ribs 94 and 95, to the inlet 80 of the passage 70, as shown in FIG. 4 and 10. From the inlet 80, the cooling air 32" flows through the passage 70 in the overhanging portion 48 of the platform 46 to the outlet 88 formed in the platform downstream face 61, thereby providing convection cooling. Thus, according to the current invention, the cooling air 32" provides for both impingement and convection cooling of the platform 46. Finally, the spent cooling air 33" mixes with the hot gas 30 flowing through the turbine section 3.

As can be seen, the cooling scheme according to the current invention provide vigorous cooling of the blade root platform 46 without the use of large quantities of cooling air, such as would be the case if the increased cooling were attempted by increasing the film cooling by increasing the flow rate of the innermost stream of the cooling air 45 discharged from the row one vane 17.

As shown in FIG. 10, a thermal barrier coating 102 of the type well known in the art may be applied to the radially outward facing surface 67 of the platform 46 that is exposed to the flow of hot gas 30 to retard the transfer of heat into the platform.

Although the present invention has been described with reference to the first row blade, the invention is also applicable to other blade rows. Accordingly, the present invention may be embodied in other specific forms without departing from the spirit or essential attributes thereof and, accordingly, reference should be made to the appended claims, rather than to the foregoing specification, as indicating the scope of the invention.

What is claimed is:

1. A gas turbine, comprising:
 a) a compressor section for producing compressed air;
 b) a combustion section for heating a first portion of said compressed air, thereby producing a hot compressed gas;
 c) a turbine section for expanding said hot compressed gas, said turbine section having a rotor disposed therein, said rotor having a plurality of blades attached thereto, each of said blades having an airfoil portion and a root portion, said root portion having a platform from which said airfoil portion extends, said platform having upstream and downstream faces and a first surface exposed to said hot compressed gas and a second surface disposed opposite said first surface; and
 d) means for cooling said blade root platform including means for directing a cooling fluid to impinge against said second surface of said platform, wherein said blade platform cooling means comprises a member spaced from said second surface and forming a cavity therebetween, the member having a plurality of holes therein, said cooling fluid flowing through said holes into said cavity and a passage extending though a manor portion of said platform having an inlet in flow communication with said cavity and an outlet formed in said downstream face in flow communication with said hot compressed gas, whereby said passage directs said cooling fluid from said cavity to said hot compressed gas.

2. The gas turbine according to claim 1, wherein said member is a plate.

3. The gas turbine according to claim 1, wherein said airfoil portion has convex and concave surfaces, a first portion of said platform being disposed opposite said concave airfoil surface, said cavity being disposed in said first portion of said platform.

4. The gas turbine according to claim 3, wherein a second portion of said platform is disposed opposite said convex surface, and wherein said blade root platform cooling means further comprises a first passage extending through said second portion of said platform.

5. The gas turbine according to claim 4, wherein said blade root platform cooling means further comprises a second passage extending through said first portion of said platform and having an inlet in flow communication with said cavity.

6. The gas turbine according to claim 5, wherein said root portion has a radially extending shank portion connected to said platform, said first and second portions of said platform extending transversely beyond said shank portion.

7. The gas turbine according to claim 1, wherein said blade root platform cooling means further comprises a first cooling fluid passage extending diagonally through said platform.

8. The gas turbine according to claim 7, wherein said blade root platform cooling means further comprises a second cooling fluid passage extending longitudinally through said platform.

* * * * *